United States Patent
Pfeiffer et al.

(10) Patent No.: US 9,266,676 B2
(45) Date of Patent: Feb. 23, 2016

(54) LOW PROFILE, HANDS FREE ACTUATION, POWER ASSIST ROLL OFF DOLLY

(71) Applicant: Toyota Motor Engineering & Manufacturing North America, Inc., Erlanger, KY (US)

(72) Inventors: Randy Lee Pfeiffer, Haubstadt, IN (US); Aaron James Wilson, Tennyson, IN (US); Kenneth W Raider, Evansville, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 94 days.

(21) Appl. No.: 13/961,566

(22) Filed: Aug. 7, 2013

(65) Prior Publication Data
US 2015/0041284 A1    Feb. 12, 2015

(51) Int. Cl.
*B65G 47/00*    (2006.01)
*B65G 13/071*   (2006.01)
*B65G 13/06*    (2006.01)
*B65G 13/07*    (2006.01)

(52) U.S. Cl.
CPC ............ *B65G 13/071* (2013.01); *B65G 13/065* (2013.01); *B65G 13/07* (2013.01)

(58) Field of Classification Search
CPC ..... B65G 13/071; B65G 13/065; B65G 13/07
USPC .................................. 198/782, 790
See application file for complete search history.

(56) References Cited

U.S. PATENT DOCUMENTS

| | | | |
|---|---|---|---|
| 2,915,207 A | | 12/1959 | Ryan |
| 3,581,875 A | * | 6/1971 | Guis ............................. 198/782 |
| 4,088,224 A | | 5/1978 | Kittredge |
| 4,308,946 A | * | 1/1982 | Ouellette ....................... 198/790 |
| 4,349,100 A | * | 9/1982 | McLean ........................ 198/783 |
| 4,362,238 A | | 12/1982 | Rivette |
| 4,620,628 A | * | 11/1986 | Greenlee ....................... 198/790 |
| 4,715,766 A | * | 12/1987 | Gebhardt ....................... 414/392 |
| 4,781,514 A | * | 11/1988 | Schneider ...................... 414/520 |
| 5,348,139 A | * | 9/1994 | Szarkowski et al. ..... 198/781.05 |
| 6,814,222 B2 | | 11/2004 | Henson et al. |

OTHER PUBLICATIONS

Roach Conveyors, "Zero Pressure Accumulators, Tech Handbook, Model 196ZPA & SZ196ZPA Smart Zone", Trumann, AK, Rev. 3-07.

* cited by examiner

*Primary Examiner* — William R Harp
(74) *Attorney, Agent, or Firm* — Christopher G. Darrow; Darrow Mustafa PC

(57) ABSTRACT

A dolly and methods for transporting and discharging items. The dolly includes a frame and one or more power conveyer assemblies. The one or more power conveyer assemblies include a set of transfer rollers and a drive mechanism. The drive mechanism includes a drive motor, a continuous drive belt, a set of idler pulleys, a plurality of electrical actuation members, and a foot actuation pedal. Engagement of the foot actuation pedal can cause the drive motor to rotate the continuous drive belt around the set of idler pulleys and the plurality of electrical actuation members to move the continuous drive belt into an interference position with the set of transfer rollers. This can result in rotation of the set of transfer rollers and application of a discharge force to items set upon them.

20 Claims, 5 Drawing Sheets

LOW PROFILE, HANDS FREE ACTUATION, POWER ASSIST ROLL OFF DOLLY

BACKGROUND

The manufacturing and assembly process for automotive vehicles requires workers to transport automobile assembly components to various assembly stations. Transportation of such components will often be achieved with a dolly. The dolly can carry a large or heavy load of components to a destination where the load is discharged. Discharging such large or heavy loads can require substantial force, often applied manually by a factory worker.

SUMMARY

A dolly and method for assisting users in transporting heavy loads to discharge destinations and in unloading or discharging the heavy loads at the destinations.

In one implementation, a dolly for transporting and providing assisted discharge of one or more items is disclosed. The dolly comprises: a frame; and one or more power conveyer assemblies, each power conveyer assembly comprising: a set of transfer rollers, each transfer roller configured to float substantially vertically within the frame; a drive mechanism configured to engage the set of transfer rollers, the drive mechanism comprising: a drive motor; a continuous drive belt in mechanical communication with the drive motor; a set of idler pulleys configured to support continuous rotation of the drive belt; a plurality of electrical actuation members configured to move the continuous belt drive into and out of an interference position with the set of transfer rollers; and a foot actuation pedal the drive motor and the plurality of electrical actuation members; wherein the foot actuation pedal is configured to actuate the drive motor and the electrical actuation members.

In another implementation, a method for discharging one or more items is disclosed. The method comprises loading one or more items onto a set of transfer rollers configured to float substantially vertically in a frame of a dolly; engaging a foot actuation pedal on a drive mechanism of the dolly to initiate rotation of a continuous drive belt and to move the continuous drive belt into an interference position with the set of vertically floating transfer rollers, causing the set of vertically floating transfer rollers to apply an assisting discharge force to the one or more items; disengaging the foot actuation pedal to move the continuous drive belt out of an interference position with the set of transfer rollers and to discontinue the application of assisting discharge force to the one or more items; and applying a manual discharge force to direct the one or more items to a discharge destination.

In another implementation, a method of transporting and using assisted discharge of one or more automobile assembly components used in an automobile assembly facility is disclosed. The method comprises loading one or more automobile assembly components to be transported onto a set of transfer rollers configured to float substantially vertically in a frame of a dolly; transporting the dolly to a delivery point; engaging a foot actuation pedal on a drive mechanism of the dolly to initiate rotation of a continuous drive belt and to move the drive belt into an interference position with the set of vertically floating transfer rollers, causing the set of vertically floating transfer rollers to apply an assisting discharge force to the one or more automobile assembly components; disengaging the foot actuation pedal to move the continuous drive belt out of an interference position with the set of transfer rollers and to discontinue the application of assisting discharge force to the one or more automobile assembly components; and applying a manual discharge force to direct the one or more automobile assembly components to a discharge destination.

BRIEF DESCRIPTION OF THE DRAWINGS

The description herein makes reference to the accompanying drawings wherein like reference numerals refer to like parts throughout the several views, and wherein.

DETAILED DESCRIPTION

A dolly and methods for transporting and discharging one or more items using the dolly are described here. The dolly includes one or more power conveyer assemblies supported within a frame. Each power conveyer assembly includes a set of transfer rollers, a drive mechanism configured to engage the set of transfer rollers, and a foot actuation pedal which when engaged can actuate the drive mechanism and when disengaged can disengage or deactuate the drive mechanism. The drive mechanism includes a drive motor, a continuous drive belt, a set of idler pulleys, and a plurality of electrical actuation members. The dolly is so configured that when the foot actuation pedal is engaged, the drive motor will drive or rotate the continuous drive belt supported on the set of idler pulleys, and the electrical actuation members will move the drive belt into an interference position with the transfer rollers. Once in the interference position, the continuous drive belt can rotate the set of transfer rollers and cause the set of transfer rollers to apply an assisting discharge force to the one or more items.

Figure 1:
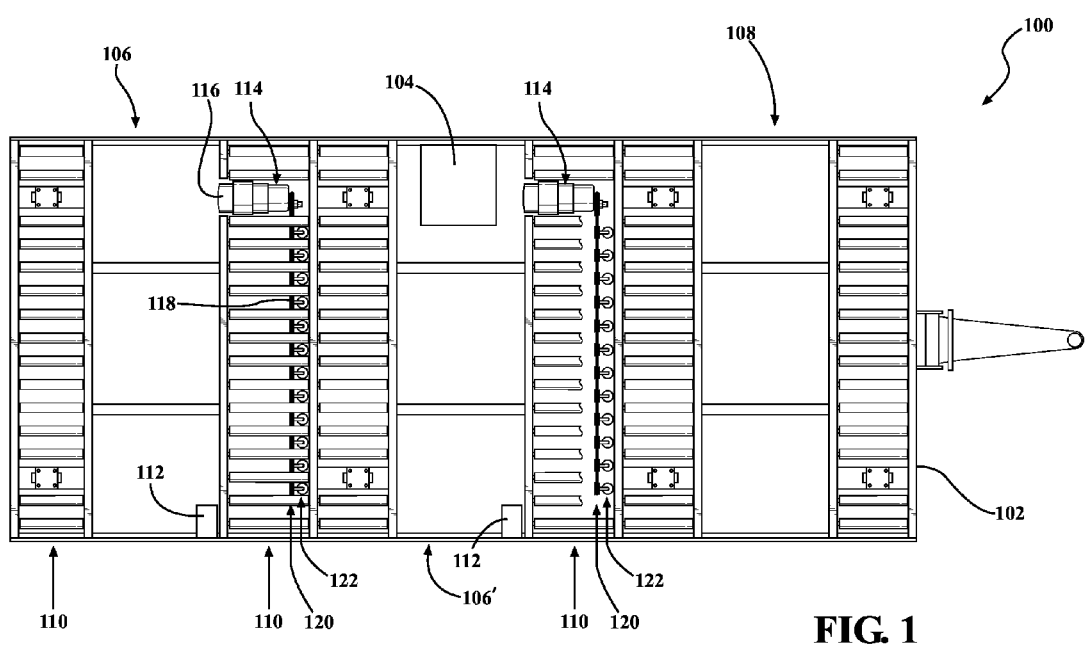
FIG. 1 is a plan view of a dolly with two power conveyer assemblies and one unassisted conveyer assembly.

FIG. 1 is a plan view of a dolly 100 with a frame 102 supporting a first power conveyer assembly 106, a second power conveyer assembly 106', and a manual conveyer assembly 108. The first and second power conveyer assemblies 106, 106' are identical except that a set of transfer rollers 110 is shown on the first power conveyer assembly 106 but is partially removed from the second power conveyer assembly 106' to enable a clearer view of a drive mechanism 114 associated with the second power conveyer assembly 106'. The power conveyer assemblies 106, 106' each have a foot actuation pedal 112 and a drive mechanism 114. The drive mechanism 114 includes a drive motor 116 in mechanical communication with a continuous drive belt 118 supported on a set of idler pulleys 120, the set of idler pulleys 120 in communication with a plurality of electrical actuation members 122. Manual conveyer assembly 108 includes a set of transfer rollers 110 but does not have a drive mechanism 114. In some configurations, the dolly 100 can additionally include a power source 104 configured to supply power to the drive motor 116 and electrical actuation members 122. In other configurations, power can be supplied from a tugger or other transport vehicle pulling the dolly 100. These features are described in greater detail in FIGS. 2-4 below.

Figure 2:
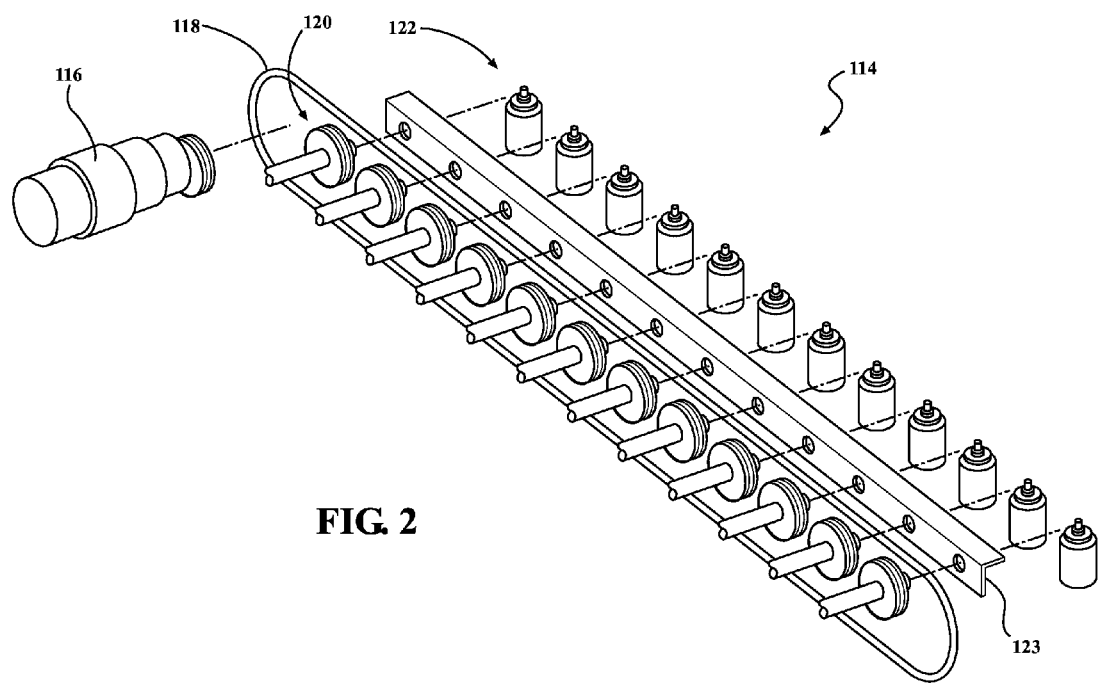
FIG. 2 is an exploded view of a drive mechanism of one power conveyer assembly of the dolly as shown in FIG. 1.

FIG. 2 is an exploded view of the drive mechanism 114 of one power conveyer assembly 106 of the dolly as shown in FIG. 1. The drive mechanism 114 includes a drive motor 116, a continuous drive belt 118, a set of idler pulleys 120, and a plurality of electrical actuation devices 122. The foot actuation pedal 112 of FIG. 1 is in electrical communication with the drive motor 116 and the plurality of electrical actuation members 122 and is configured so that engagement of the foot actuation pedal 112 causes the drive motor 116 to rotate the continuous drive belt 118 about the set of idler pulleys.

Engagement of the foot actuation pedal 112 concurrently causes the plurality of electrical actuation members 122 to move the set of idler pulleys 120 and the continuous drive belt 118 from a first position in which the continuous drive belt 118 is not in communication with the set of transfer rollers 110 to a second position in which the continuous drive belt 118 is in communication with the set of transfer rollers 110. The state in which the set of idler pulleys 120 and the continuous drive belt 118 are in the first position can be described as a disengaged state or a deactuated state of the drive mechanism 114. The state in which the set of idler pulleys 120 and the continuous drive belt 118 are in the second position can be described as an actuated or engaged state of the drive mechanism 114. In other words, in the second position, the continuous drive belt 118 is in an interference position with the set of transfer rollers. In the example of FIG. 2 mechanical communication between the set of idler pulleys 120 and the plurality of electrical actuation members 122 is mediated by an idler pulley mounting bracket 123, although any means of transferring movement of the plurality of electrical actuation members 122 to the set of idler pulleys 120 is acceptable.

In some embodiments, disengagement of the foot actuation pedal 112 will cause the drive motor 116 to discontinue rotating the continuous drive belt 118 and will cause the plurality of electrical actuation members 122 to move the continuous drive belt 118 out of an interference position with the set of transfer rollers 110. In some embodiments, the plurality of electrical actuation members 122 can comprise solenoid electromechanical devices. Such solenoid electromechanical devices can include a helical conductor which, upon application of an electrical current, produces a magnetic field to drive motion of a magnetically susceptible member. In other embodiments, other types of electromechanical devices can be used.

Figure 3A:
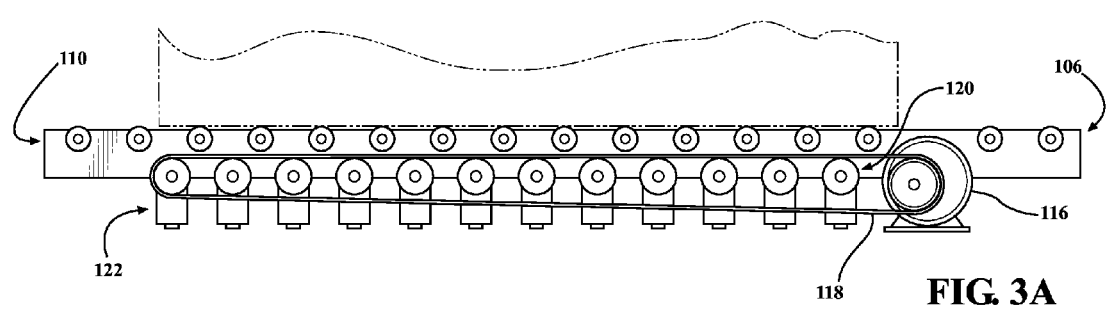
FIG. 3A is a side sectional view of the power conveyer assembly of FIG. 1 with a continuous drive belt in a disengaged state.

FIG. 3A is a side sectional view of a power conveyer assembly 106 with the continuous drive belt 118 in a disengaged state. In FIG. 3A, the plurality of electrical actuation members 122 have not moved the set of idler pulleys 120 and the continuous drive belt 118 into the second position wherein the continuous drive belt 118 is in an interference position with the set of transfer rollers 110. When the drive mechanism 114 is in this disengaged state, it does not exert drag or friction on the set of transfer rollers 110 which can rotate freely. This allows the one or more items to move freely on the set of transfer rollers 110, due to any of momentum and an applied manual force, when the drive mechanism 114 is in a disengaged state.

Figure 3B:
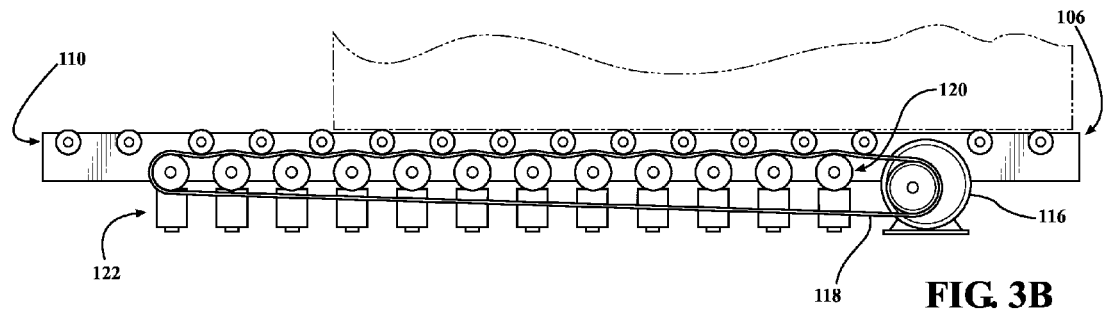
FIG. 3B is a side sectional view of the power conveyer assembly of FIG. 1 with the continuous drive belt in an interference position with a set of vertically floating transfer rollers.

FIG. 3B is a side sectional view of the power conveyer assembly 106 with the drive belt 118 in an interference position with the set of transfer rollers 110. Engagement of the foot actuation pedal 112 has caused the plurality of electrical actuation members 122 to raise the set of idler pulleys 120 relative to the frame 102, moving the continuous drive belt 118 into an interference position with the set of transfer rollers 110. When the drive mechanism 114 is engaged as in FIG. 3B, the drive motor 116 rotates the continuous drive belt 118. The continuous drive belt 118 rotates the set of transfer rollers 110 which apply an assisting discharge force to the one or more items.

In operating the dolly of FIG. 1, a user can engage the foot actuation pedal 112 to apply an assisting discharge force to the one or more items, offsetting the potentially large initial force required to begin moving the one or more items. Once the one or more items have begun moving, the user can disengage the foot actuation pedal 112, discontinuing the application of assisting discharge force. The user can then apply a manual discharge force to direct the one or more items toward the discharge destination. Because disengagement of the foot actuation pedal 112 allows the set of transfer rollers 110 to rotate freely, the momentum imparted to the one or more items by application of the assisting discharge force can decrease the manual discharge force required to discharge the one or more items. This can be described as the assisting discharge force offsetting a portion of the manual discharge force required to discharge the one or more items. The absence of drag imposed on the set of transfer rollers 110 by the drive mechanism 114 when the drive mechanism 114 is disengaged can maximize the extent to which manual discharge force is offset.

Figure 4A:
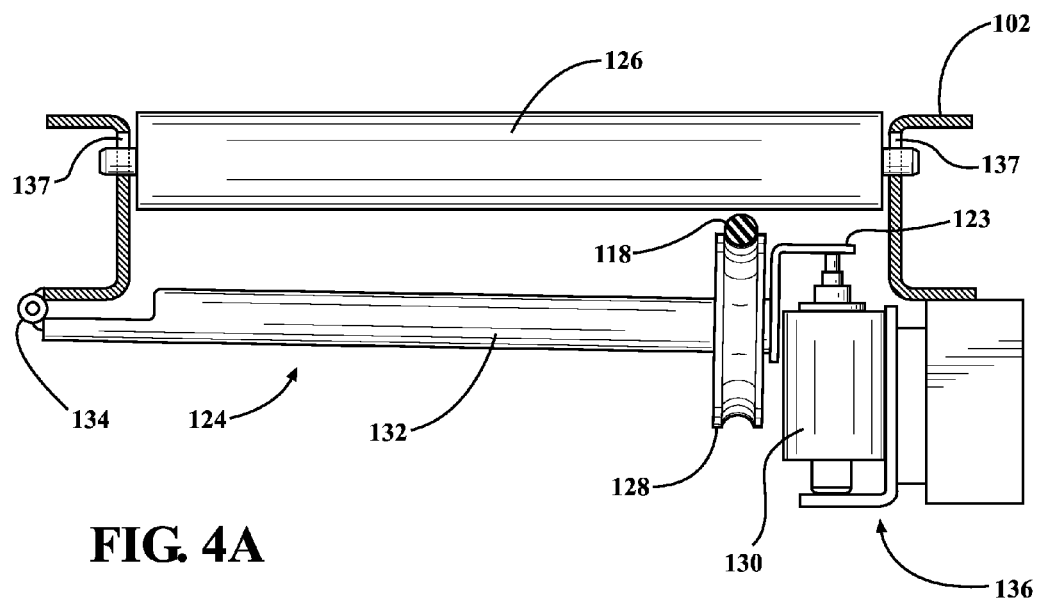
FIG. 4A is an end view of a cross section of the drive mechanism of one power conveyer assembly of the dolly of FIG. 1 in a disengaged state.

FIG. 4A is an end view of a dolly cross-section showing a drive mechanism subunit 124 and a transfer roller 126. The drive mechanism subunit 124 includes a idler pulley 128 and an electrical actuation member 130. In the example of FIG. 4, a user has not engaged foot actuation pedal 112 and therefore drive mechanism subunit 124 is in a disengaged state and drive belt 118 is not in an interference position with transfer roller 126. Drive arm 132 is in communication on one end with the axle of idler pulley 128 and is supported on the other end by hinge 134 which is supported on frame 102. Electrical actuation member 130 is supported on actuation member adjustment mount 136, which is supported by frame 102. The actuation member adjustment mount 136 can be used to adjust the position of the plurality of electrical actuation members 122, including electrical actuation member 130. Adjustment of the actuation member adjustment mount 136 is a fine adjustment to provide maximum assist force by ensuring that the plurality of electrical actuation members 122 are working in their maximum force range without running out of travel, while putting drive belt 118 into an interference position with the set of transfer rollers 110. In the disengaged state of FIG. 4A the axle of transfer roller 126 sits at the bottom of vertical slots 137 disposed within frame 102.

Figure 4B:
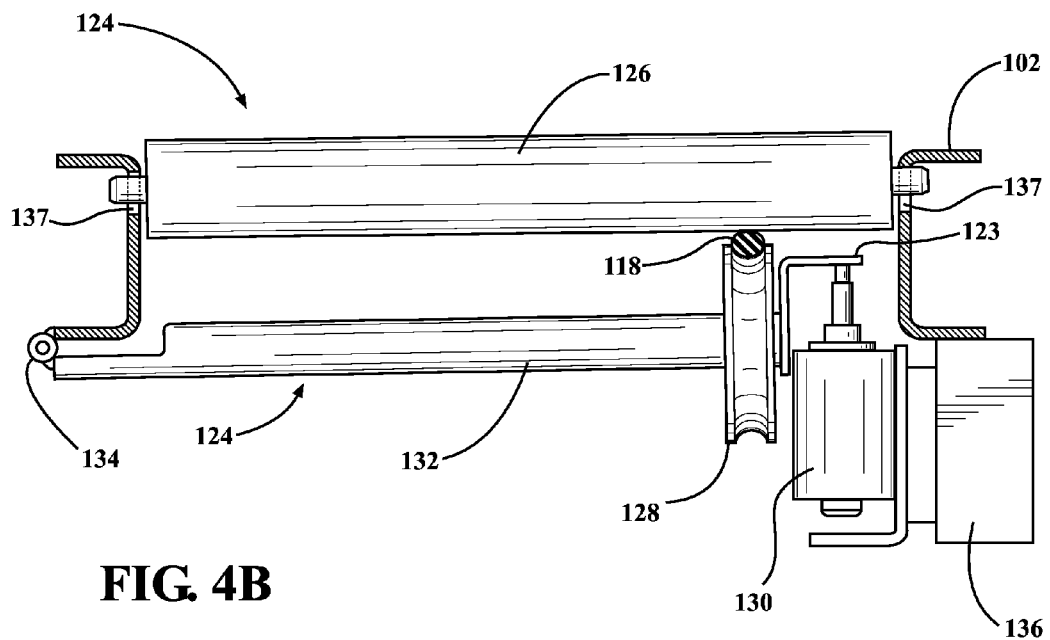
FIG. 4B is an end view of a cross section of the drive mechanism of one power conveyer assembly of the dolly of FIG. 1 in an engaged state.

FIG. 4B is an end view of the dolly cross-section as in FIG. 4A, where a user has engaged the foot actuation pedal 112 causing drive mechanism subunit 124 to engage and putting drive belt 118 into an interference position with transfer roller 126. Vertical slots 137 have enabled transfer roller 126 to float vertically. This vertical flotation as exemplified in FIG. 4B can enable transfer roller 126, or any roller of the set of transfer rollers 110, to contact an item with an uneven surface. Though particular examples of transfer roller 126 vertical flotation, idler pulley 128 support structure, and electrical actuation member 130 support structure are shown here for illustrative purposes, alterations of design which accomplish the same end are acceptable.

Figure 5:
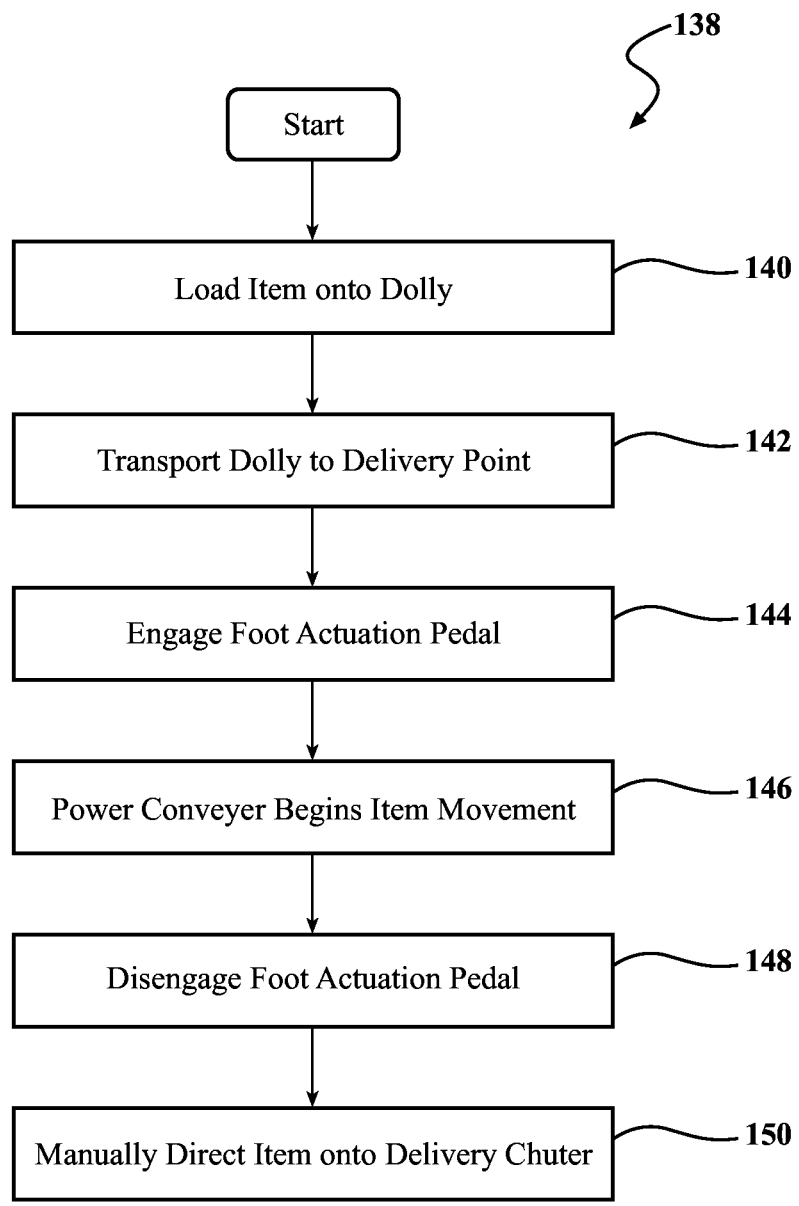
FIG. 5 is a flow-chart of a method for transporting and using assisted discharge with the dolly of FIG. 1.

FIG. 5 is a flowchart illustrating a method 138 of transporting one or more items to a discharge destination and discharging the one or more items at the discharge destination using a dolly 100 of the type illustrated in FIG. 1. In step 140, an item, for example a pallet containing automobile assembly components, can be placed on the set of transfer rollers 110 of a power conveyer assembly 106 of a dolly 100. In step 142, the dolly 100 can be transported to a discharge destination, such as an automobile assembly station appropriate to the contents of the one or more items. The dolly 100 could be transported by any means, such as manually, by a powered transport mechanism incorporated into the dolly, or with the assistance of a separate transport vehicle. In step 144, a user can engage the foot actuation pedal 112 of the dolly 100, causing the drive motor 116 to rotate continuous drive belt 118 and the plurality of electrical actuation members 112 to move the continuous drive belt 118 into an interference position with the set of transfer rollers 110. This results in step 146, where the set of transfer rollers 110 apply an assisting discharge force to the item, moving it in the direction of the discharge destination. In step 148, the user can disengage the foot actuation pedal 112, setting the drive mechanism 114 to a disengaged state and causing the set of transfer rollers 110 to discontinue applying an assisting discharge force to the item. In step 150, the user can apply a manual discharge force to the item, for example by pushing the item, toward the discharge destination. In step 150, the user can utilize the inertia imparted to the item during step 146 so that less manual force is required during step 150 than would have been the case absent step 146. In addition, one or more expended items such as one or more pallets from which automobile assembly components have been removed could be loaded onto the manual conveyer assembly 108 for transport to a discharge station for expended items.

The dolly 100 described in respect to method 138 can improve the ergonomics of item transport and discharge. This may be particularly true when the items to be transported and discharged are heavy or large, such as in an automobile assembly plant. Item discharge from other dollies can require a user to apply very high manual discharge force, particularly as the manual discharge force is applied to initiate discharge movement of a stationary item. The dolly 100 described here can significantly reduce a user's manual discharge force requirement, lessening strain and potentially preventing physical injury. The compact design of the drive mechanism 114 also enables a low profile of the dolly 100. A low profile of the dolly can allow discharge of items with working heights close to the ground. This also can improve discharge ergonomics in situations where the discharge destination is at or near ground level.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A dolly for transporting and providing assisted discharge of one or more items, comprising:
    a frame; and
    one or more power conveyer assemblies, each power conveyer assembly comprising:
        a first set of transfer rollers, each transfer roller configured to float substantially vertically within the frame;
        a drive mechanism configured to engage the first set of transfer rollers, the drive mechanism comprising:
            a drive motor;
            a continuous drive belt in mechanical communication with the drive motor;
            a plurality of drive arms;
            a set of idler pulleys supported on respective drive arms and configured to support continuous rotation of the continuous drive belt, each idler pulley of the set of idler pulleys having an axle coaxially aligned with the drive arm on which the idler pulley is supported;
            a plurality of electrical actuation members supporting the set of idler pulleys and configured to move the continuous drive belt into and out of an interference position with the first set of transfer rollers;
            at least one actuation member adjustment mount configured to enable adjustment of a position of the plurality of electrical actuation members; and
        a foot actuation pedal in electrical communication with the drive motor and the plurality of electrical actuation members;
    wherein the foot actuation pedal is configured to actuate the drive motor and the electrical actuation members.

2. The dolly of claim 1 wherein each roller of the first set of transfer rollers is disposed within a pair of opposed substantially vertical slots.

3. The dolly of claim 1 wherein each of the plurality of electrical actuation members comprises a solenoid electromechanical device.

4. The dolly of claim 1 wherein the foot actuation pedal is configured to enable hands-free operation of the drive motor and the plurality of electrical actuation members and to electrically control the drive motor to drive rotational movement of the continuous drive belt.

5. The dolly of claim 1 further comprising an electric battery in electrical communication with the foot actuation pedal and configured to supply power to the drive motor and the plurality of electrical actuation members.

6. The dolly of claim 1 wherein actuation of the one or more power conveyer assemblies reduces a manual force required of a user to discharge an item from the dolly.

7. The dolly of claim 1 further comprising:
    a manual conveyer assembly comprising a second set of transfer rollers, the manual conveyer assembly configured to support one or more expended items.

8. A method for discharging one or more items, comprising:
    loading one or more items onto a first set of transfer rollers configured to float substantially vertically in a frame of a dolly;
    engaging a foot actuation pedal on a drive mechanism of the dolly to initiate rotation of a continuous drive belt and to actuate a plurality of electrical actuation members that supports a set of idler pulleys, the plurality of electrical actuation members mounted on at least one actuation member adjustment mount configured to adjust a position of the plurality of electrical actuation members, the set of idler pulleys supporting rotation of the continuous drive belt, engaging of the foot actuation pedal thereby moving the continuous drive belt into an interference position with the first set of transfer rollers, causing the first set of transfer rollers to apply an assisting discharge force to the one or more items;
    disengaging the foot actuation pedal to move the continuous drive belt out of an interference position with the first set of transfer rollers and to discontinue the application of assisting discharge force to the one or more items; and applying a manual discharge force to direct the one or more items to a discharge destination.

9. The method of claim 8 wherein each roller of the first set of transfer rollers is disposed in substantially vertical slots in the frame.

10. The method of claim 8 wherein the foot actuation pedal is configured to enable hands-free operation of a drive motor and a plurality of electrical actuation members disposed in the drive mechanism and to electrically control the drive motor to rotate the continuous drive belt; and
    wherein a plurality of electrical actuation members disposed in the drive mechanism of the dolly are configured to move the continuous drive belt into an interference position with the first set of transfer rollers.

11. The method of claim 10 wherein each of the plurality of electrical actuation members comprises a solenoid electromechanical device.

12. The method of claim 10 wherein the continuous drive belt is supported on a set of idler pulleys and engagement of the foot actuation pedal causes the drive motor to rotate the continuous drive belt.

13. The method of claim 8 wherein the assisting discharge force applied to the one or more items offsets at least a portion of the manual discharge force required from a user to discharge the one or more items.

14. The method of claim 8 further comprising:
    loading one or more expended items onto a manual conveyer assembly in the dolly, the manual conveyer assembly comprising a second set of transfer rollers configured to support one or more expended items.

15. A method of transporting and discharging one or more automobile assembly components used in an automobile assembly facility, comprising:
    loading one or more automobile assembly components to be transported onto a first set of transfer rollers configured to float substantially vertically in a frame of a dolly;
    transporting the dolly to a delivery point;
    engaging a foot actuation pedal on a drive mechanism of the dolly to initiate rotation of a continuous drive belt and to actuate a plurality of electrical actuation members that supports a set of idler pulleys, the plurality of electrical actuation members mounted on at least one actuation member adjustment mount configured to adjust a position of the plurality of electrical actuation members, the set of idler pulleys supporting rotation of the continuous drive belt, engaging of the foot actuation pedal thereby moving the drive belt into an interference position with the first set of transfer rollers, causing the first set of transfer rollers to apply an assisting discharge force to the one or more automobile assembly components;
    disengaging the foot actuation pedal to move the continuous drive belt out of an interference position with the first set of transfer rollers and to discontinue the application of assisting discharge force to the one or more automobile assembly components; and
    applying a manual discharge force to direct the one or more automobile assembly components to a discharge destination.

16. The method of claim 15 wherein each roller in the first set of transfer rollers is disposed in substantially vertical slots in the frame.

17. The method of claim 15 wherein the foot actuation pedal is configured to enable hands-free operation of a drive motor and a plurality of electrical actuation members disposed in the drive mechanism and to electrically control the drive motor to rotate the continuous drive belt; and wherein the electrical actuation members are configured to move the continuous drive belt into an interference position with the first set of transfer rollers.

18. The method of claim 17 wherein each of the plurality of electrical actuation members comprises a solenoid electromechanical device.

19. The method of claim 15 wherein the assisting discharge force applied to the one or more automobile assembly components offsets a portion of the manual discharge force required from a user to discharge the one or more automobile assembly components.

20. The method of claim 15 further comprising:
    loading one or more expended items onto a manual conveyer assembly in the dolly, comprising a second set of transfer rollers, configured to support one or more expended items.

* * * * *